United States Patent
Sakai et al.

(10) Patent No.: US 7,057,844 B2
(45) Date of Patent: Jun. 6, 2006

(54) METHOD AND APPARATUS FOR HEAD POSITIONING CONTROL IN A DISK DRIVE

(75) Inventors: Yuji Sakai, Ome (JP); Koji Osafune, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/037,167

(22) Filed: Jan. 19, 2005

(65) Prior Publication Data

US 2005/0168863 A1 Aug. 4, 2005

(30) Foreign Application Priority Data

Jan. 29, 2004 (JP) .............................. 2004-021650

(51) Int. Cl.
*G11B 5/596* (2006.01)
(52) U.S. Cl. .................................. 360/77.04
(58) Field of Classification Search ............ 360/77.04, 360/77.05, 77.08, 75, 63, 77.06; 369/53.3
See application file for complete search history.

(56) References Cited

U.S. PATENT DOCUMENTS

| | | | | |
|---|---|---|---|---|
| 5,262,907 A | * | 11/1993 | Duffy et al. ............. | 360/77.05 |
| 5,825,579 A | * | 10/1998 | Cheung et al. .......... | 360/77.08 |
| 5,940,240 A | * | 8/1999 | Kupferman ............... | 360/77.08 |
| 6,078,461 A | * | 6/2000 | Smith et al. ............. | 360/77.08 |
| 6,292,320 B1 | * | 9/2001 | Mason et al. ............ | 360/63 |
| 6,429,995 B1 | * | 8/2002 | Dobbek et al. .......... | 360/77.08 |
| 6,519,107 B1 | * | 2/2003 | Ehrlich et al. ........... | 360/75 |
| 6,522,493 B1 | * | 2/2003 | Dobbek et al. .......... | 360/75 |
| 6,545,836 B1 | * | 4/2003 | Ioannou et al. .......... | 360/77.06 |
| 6,594,103 B1 | * | 7/2003 | Despain et al. .......... | 360/77.06 |
| 6,631,046 B1 | * | 10/2003 | Szita et al. ............... | 360/75 |
| 6,904,010 B1 | * | 6/2005 | Kuroba et al. ........... | 369/53.3 |

FOREIGN PATENT DOCUMENTS

| | | |
|---|---|---|
| JP | 11-126444 | 5/1999 |
| JP | 2001-134905 | 5/2001 |

* cited by examiner

*Primary Examiner*—David Hudspeth
*Assistant Examiner*—Fred F. Tzeng
(74) *Attorney, Agent, or Firm*—Pillsbury Winthrop Shaw Pittman, LLP

(57) ABSTRACT

A disk drive is disclosed which performs a head positioning operation capable of coping with a variation of an offset caused by a disk runout. A CPU of a head positioning control system calculates a second position offset amount by correcting a first position offset amount corresponding to a rotation angle of an actuator on a disk medium based on a disk runout amount. The CPU performs head positioning control including a position correction operation corresponding to a second position offset amount.

9 Claims, 5 Drawing Sheets

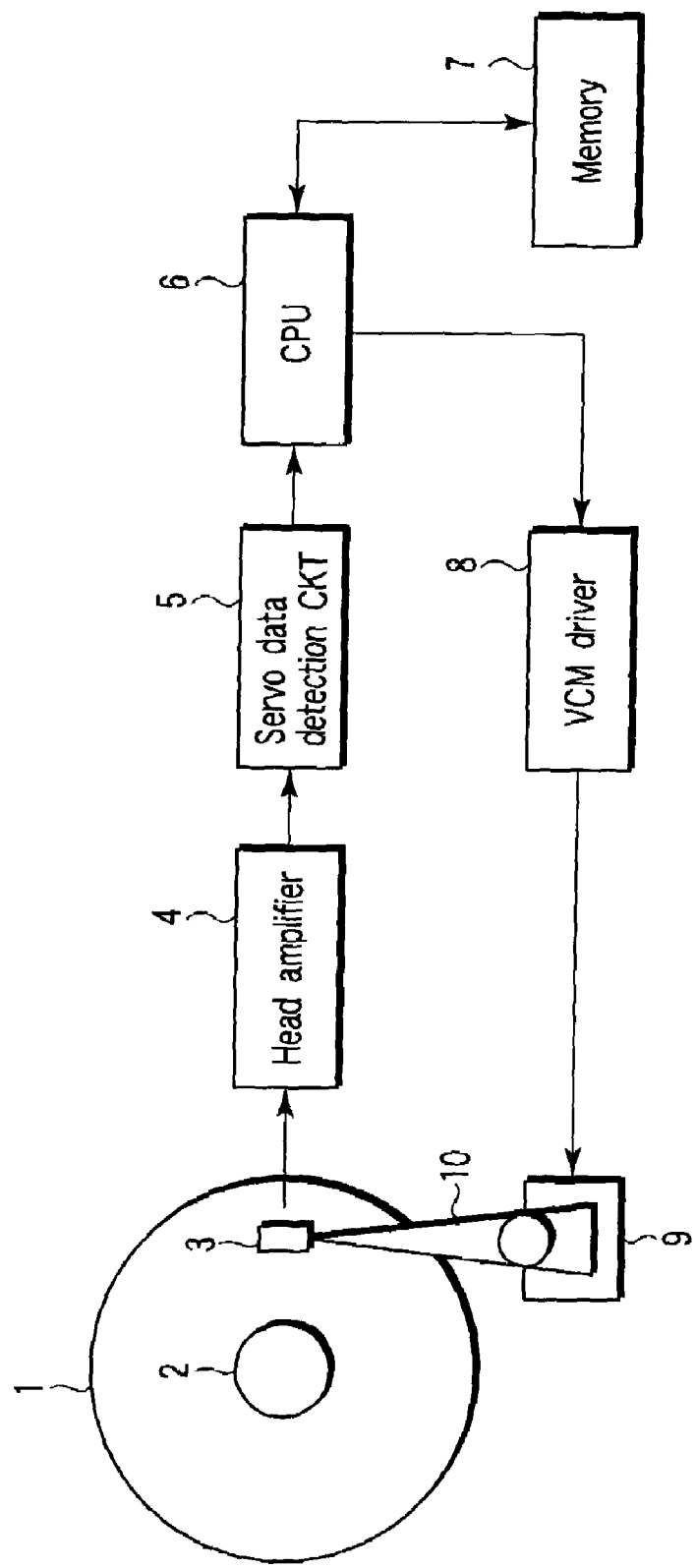
F I G. 1

# METHOD AND APPARATUS FOR HEAD POSITIONING CONTROL IN A DISK DRIVE

CROSS-REFERENCE TO RELATED APPLICATIONS

This application is based upon and claims the benefit of priority from prior Japanese Patent Application No. 2004-021650, filed Jan. 29, 2004, the entire contents of which are incorporated herein by reference.

BACKGROUND OF THE INVENTION

1. Field of the Invention

The present invention relates generally to a disk drive and, in particular, to a head positioning control technique including a position correction relating to an offset between a read head and a write head.

2. Description of the Related Art

Generally, in a disk drive represented by a hard disk drive, a composite type head unit is used in which a read head and write head are separately mounted on the same slider.

The read head is comprised of, usually, an MR (magnetoresistive) element or GMR (giant magnetoresistive) element and performs a read operation (data read operation). The write head is usually comprised of an inductive thin-film head element and performs a write operation (data write operation).

These heads are usually mounted on a rotary (rotation) type actuator. The actuator is rotationally driven in a radial direction over a disk medium by a driving force of a voice coil motor (VCM) to allow the head to be positioned to a target position (target track or target cylinder).

Where the head is positioned over the disk medium by the rotary type actuator, since the read head and write head are separated, there is a gap spacing (Grw) in the peripheral direction and, further, an offset occurs between the read head and the write head due to their different radial positions over the disk medium.

Stated in more detail, when, at a data read operation time, the read head is positioned relative to a data position (track position) to which recording is made by the write head, it is necessary to effect a position correction corresponding to the offset. In the prior art technique, a positioning system is proposed in which, by applying a calculated offset amount, the read head is set to a data position for tracking over a disk medium (see JPN PAT APPLN KOKAI PUBLICATION NO. 2001-134905).

In the disk drive, on the other hand, it is known that, where any external impact is applied during an operation or any disk medium is incorporated in which servo data is recorded by an external servo track writer, a disk runout occurs in synchronism with the rotation of a spindle motor (SPM) for spinning the disk medium.

If such disk runout occurs, the positional accuracy is lowered when the head position control is performed and in order to deal with this problem an improved technique is disclosed, for example, in JPN PAT APPLN KOKAI PUBLICATION NO. 11-126444.

In the disk drive head positioning control set out above as the prior art technique, consideration is given to the offset between the read head and the write head and an improved system is proposed for improving the positional accuracy relating to the disk runout.

With respect to the head positioning control system capable of coping with any variation in offset resulting from the disk runout, however, no proposal has been disclosed in the prior art technique. Therefore, if any disk runout occurs, it is not possible to, in the head positioning control by the conventional offset correction, set the head to a target position for proper tracking on the disk medium. This may present a lowered positional accuracy problem.

BRIEF SUMMARY OF THE INVENTION

In accordance with one embodiment of the present invention there is provided a disk drive including facilities to achieve a head positioning capable of properly coping with any variation in offset resulting from a disk runout.

In an aspect of the present embodiment, a disk drive comprises an actuator configured to have a write head for writing data on a disk medium and a read head for reading out the data from the disk medium; a calculating unit configured to calculate a first position offset amount corresponding to a displacement between the write head and the read head on the disk medium and a second position offset amount correcting the first position offset amount based on a disk runout amount; and a control unit configured to perform positioning control including a position correction operation according to the second position offset amount and positioning the read head or write head to a target position on the disk medium.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a major section of a disk drive relating to an embodiment of the present invention;

DETAILED DESCRIPTION OF THE INVENTION

Figure 2:
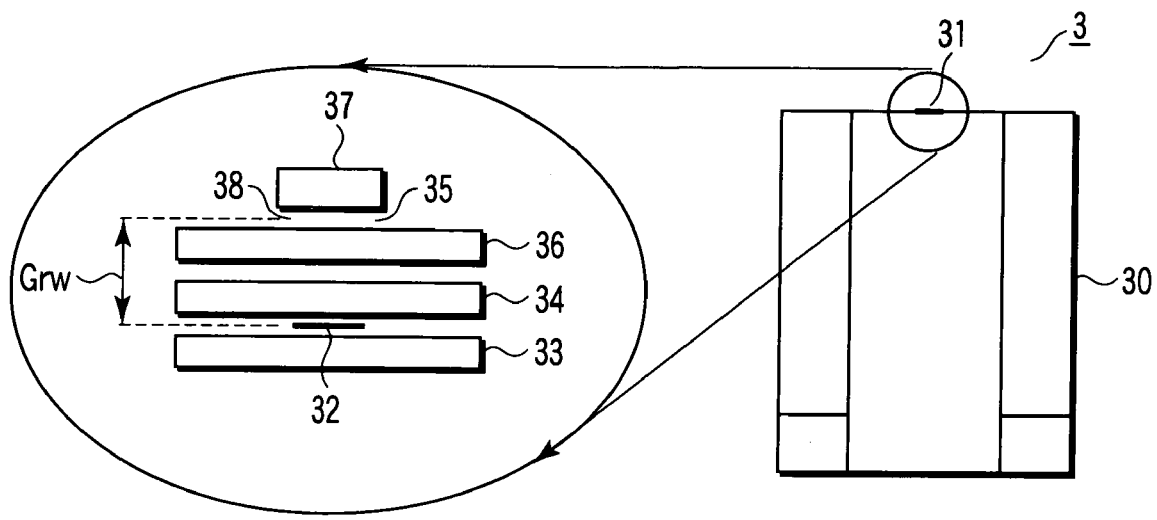
FIG. 2 is a view for explaining a structure of a head relating to the present embodiment.

The embodiment of the present invention will be explained below with reference to the drawing.

FIG. 1 is a block diagram showing a major section of a disk drive relating to the present embodiment. FIG. 2 is a view for explaining a structure of a head unit which is used in the disk drive.

(Structure of Disk Drive)

The disk drive has, as shown in FIG. 1, a disk medium 1, a spindle motor (SPM) 2 for spinning the disk medium 1, and a rotary type actuator 10 with a head unit 3 mounted thereon.

The disk medium 1 is comprised of a magnetic recording medium for allowing data to be magnetically recorded thereon by a write head in the head unit 3. The head unit 3 is a composite type having a read head and write head separately mounted on the same slider as will be set out below with reference to FIG. 2.

The actuator 10 is comprised of a saving arm type carriage mechanism adapted to be driven by a driving force of a voice coil motor (VCM) 9 in a radial direction of the disk medium 1 to allow the head 3 which is mounted thereon to be positioned to a target position (target track or target cylinder) on the disk medium 1.

The disk drive has a built-in head positioning control system (servo system) with a microprocessor (CPU) 6 as a main element. The system includes a head amplifier 4 adapted to amplify a read signal which is output from the read head in the head unit 3, a servo data detection circuit 5, a memory 7 for allowing access to be gained by the CPU 6 thereto, and a VCM driver 8.

The servo data detection circuit 5 detects servo data from the read signal output from the head amplifier 4 and outputs it to the CPU 6. The servo data detection circuit 5 is usually included in a read/write channel for processing the read signal and write signal.

Here, the servo data is head position detection data recorded on the disk medium 1 and includes address data (track or cylinder code) and servo burst data. The CPU 6 decides a position of the head 3 over the disk medium 1 with the use of the servo data.

The CPU 6 controls the VCM driver 8 based on the position error between the position of the head 3 and the target position (track or cylinder as an access target) and performs the head positioning control. The VCM driver 8 includes a D/A converter for supplying a drive current to the VCM 9. The rotation drive of the actuator 10 is controlled by the VCM driver 8.

The memory 7 is comprised of a flash memory for storing parameters for calculating an offset amount relative to the target position (target track or target cylinder) and an offset amount corresponding to a disk runout amount. The CPU 6 performs a position correction (target position correction) with the use of the offset amount read from the memory 7.

(Structure of Head Unit)

The head unit 3 is of such a structure that a composite head element 31 is mounted on a slider 30 as shown in FIG. 2. The composite head element 31 includes a GMR (giant magnetoresistive) element 32 comprised of the read head and an inductive thin-film head element comprised of a write head 35. Hereinafter, the GMR element is described as a read head 32.

The read head 32 is separated from the write head 35 by a lower shield 33 and upper shield 34. The write head 35 has a write gap 38 for generating a magnetic field between a lower magnetic pole 36 and an upper magnetic pole 37. The read head 32 is comprised of a head for performing a read operation (data read operation) and the write head 35 is comprised of a head for performing a write operation (data write operation).

Here, when the head unit 3 is positioned over the disk medium 1, a gap spacing Grw is present, between the read head 32 and the write head 35, in a peripheral direction of the disk medium 1.

(Offset at Head Positioning Operation)

Figure 3:
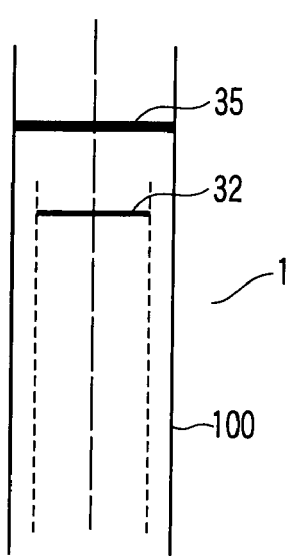
FIG. 3 is a view for explaining a skew angle in a head positioning operation relating to the present embodiment.
Figure 4:
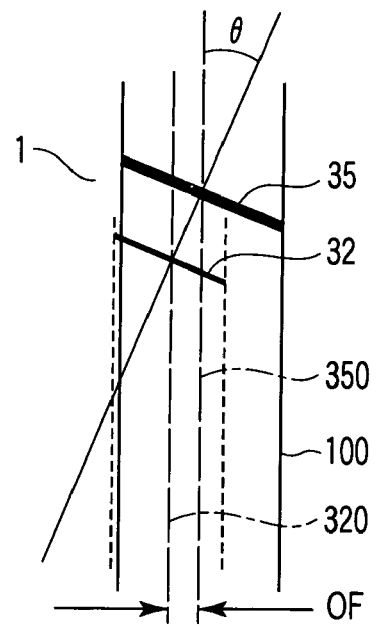
FIG. 4 is a view for explaining a relation between the skew angle and an offset in the head positioning operation relating to the present embodiment.

With reference to FIGS. 3 and 4, an explanation will be made below about the offset when the head unit 3 of the present embodiment is positioned to a target position on the disk medium 1.

For the disk drive of the present embodiment, as shown in FIG. 1, a rotary type actuator 10 is used as a head positioning mechanism. When the head positioning operation is executed by the actuator 10, as shown in FIG. 4, a slant called as a skew angle (angle $\theta$) occurs. The skew angle ($\theta$) represents an angle between a line connecting the rotation center (pivot) of the actuator 10 and the head center, on one hand, and a tangent line of a circular track arc, on the other hand.

The skew angle is determined by the position of the head unit 3, rotation center position of the SPM 2 and rotation center position of the actuator 10. That is, the skew angle varies depending upon the track position (cylinder position) where a read or a write operation is performed, that is, dependent upon the radial position on the disk medium 1.

As shown in FIG. 4, when the skew angle occurs, an offset (OF) is produced, the offset corresponding to a positional displacement between the center line of data track 100 where data is recorded by the write head 35 and the center position of a track where data is reproduced by a read head 32. When, therefore, the skew angle is zero as shown in FIG. 3, a coincidence occurs between the center position where the recording is made by the write head 35 and the center position where the reproduction is made by the read head 32.

With $\theta$ indicating the skew angle and Grw indicating the gap spacing between the read head 32 and the write head 35, the offset amount OF is determined by the following equation (1)

$$OF = Grw \times \sin(\theta) \tag{1}$$

According to the present invention, in the manufacturing process of the disk drive, parameters for calculating the offset amount OF are stored in the memory 7. Here, the offset amount OF has no relation to any influence given by a later-described disk runout and is calculated for each track position (cylinder number) on the disk medium 1. Here, for simplicity, the offset amount OF is indicated by an offset amount OFa (first position offset amount).

Where there is no influence from the disk runout, the CPU 6 in the head position determining control system positions the write head 35 to a track corresponding to a target position, at a data write operation (write operation), with the offset amount OFa as zero. At a data read operation (read operation) time, the CPU 6 performs a read head position operation.

At this time, the CPU 6 calculates the offset amount OFa corresponding to a cylinder number as a target position and performs the position correction of the read head 32 (applies an offset). By doing so, a read head 32 can be set to an "on track" position where data is recorded.

(Head Positioning Operation)

Figure 5:
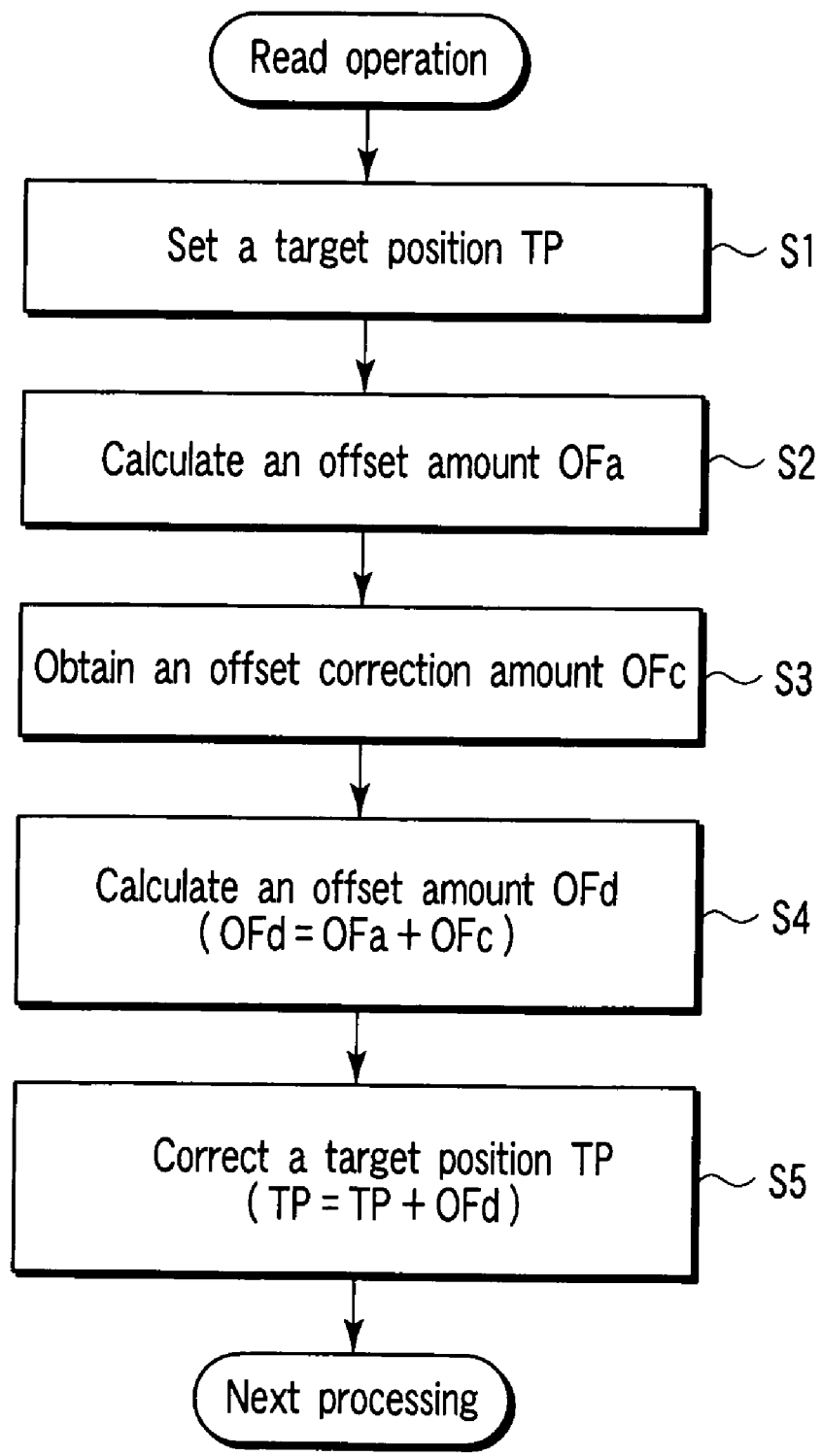
FIG. 5 is a flowchart for explaining a position correction process at a read operation time relating to the present embodiment.
Figure 6:
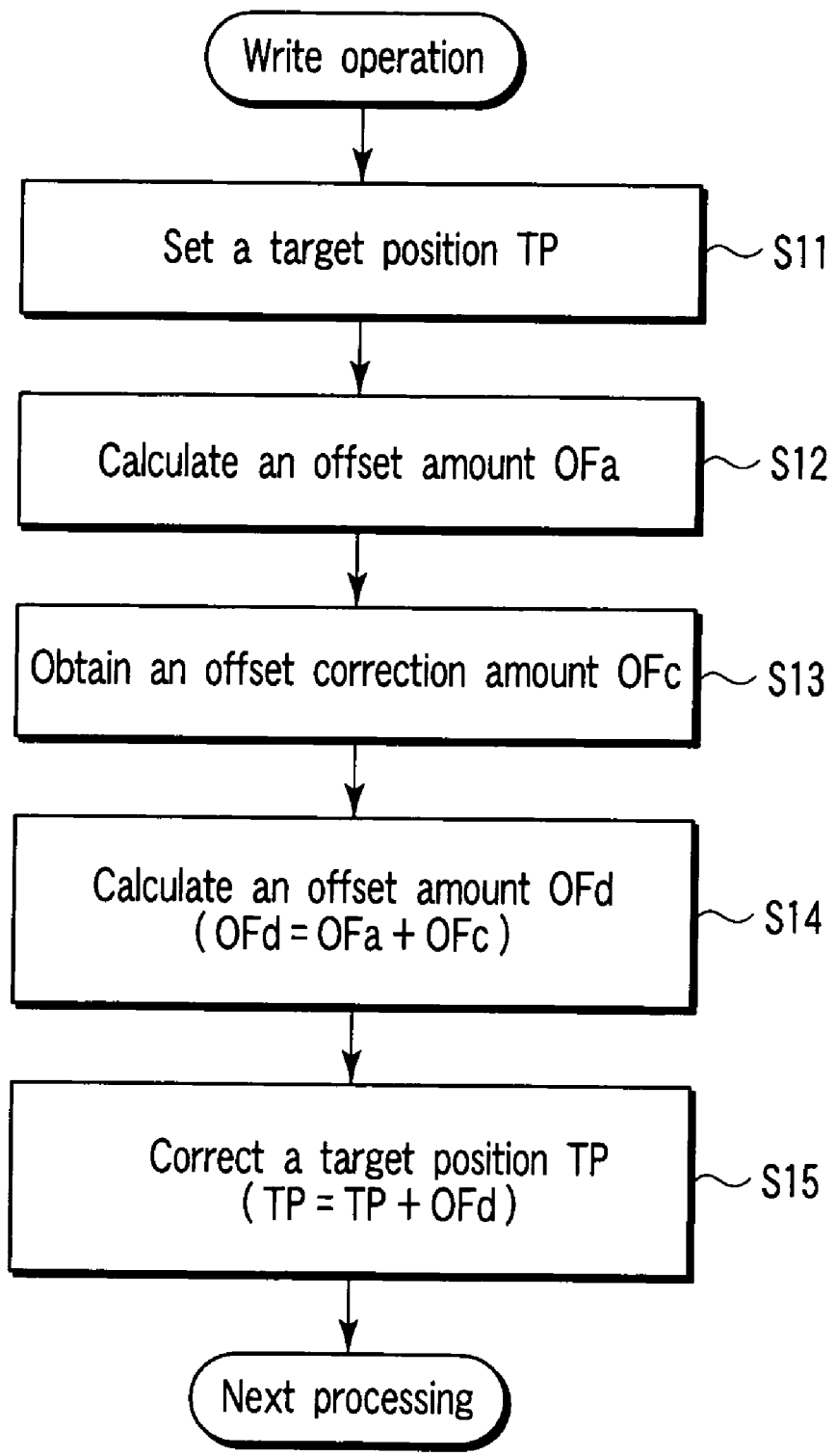
FIG. 6 is a flowchart for explaining a position correction process at a write operation time relating to the present embodiment.
Figure 7:
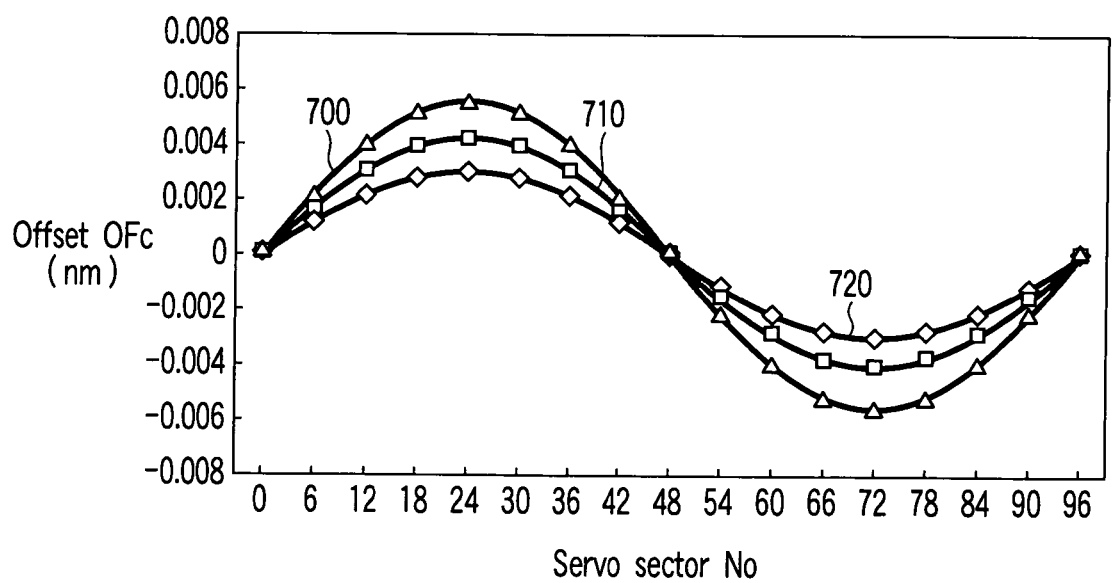
FIG. 7 is a view for explaining a practical example for explaining an offset correction amount relating to the present embodiment.

With reference to FIGS. 5 to 7, an explanation will be given below about the head positioning operation of the present embodiment while considering an influence from a disk runout involved.

The memory 7 in the disk drive stores a parameter for calculating an offset amount OFa (first position offset amount) for each track position (distinguished from the cylinder number) on the disk medium 1. As this parameter, the information representing the skew angle θ and gap spacing Grw of the read/write head (32, 35) is stored. The parameter also includes information for calculating the skew angle θ. Stated in more detail, it includes a distance v from the rotation center position of the SPM 2 to the rotation center position (pivot) of the actuator 10, a distance g from the write gap position of the write head 35, and so on.

With reference to a flowchart of FIG. 5 an explanation will be made below about the head positioning operation at a time of the read operation.

Upon receipt of a read command from a host system (not shown), the CPU 6 sets the read head 32 to a target position TP as a target track where a read target data is recorded (step S1).

The CPU 6 controls the driving of the actuator 10 and, after performing a seek operation to move the head to the neighborhood of the target position TP, shifts the movement to an "on-track" positioning operation relative to a track position as a target position TP. At this positioning operation time, the CPU 6 performs a position correction in accordance with the offset.

The CPU 6 calculates the offset amount OFa which is necessary for the position correction by a later-described equation (3) with the use of the parameter stored in the memory 7 (step S2). It is to be noted that, if the offset amount OFa is initially stored in the memory 72, the CPU 6 may read out and obtain the offset amount OFa corresponding to the target position.

Here, where any disk runout occurs in the disk drive due to, for example, an external shock, the CPU 6 performs correction processing on the offset amount based on an influence resulting from the runout (steps S3, S4). Hereinbelow, an explanation will be made in more detail about the processing above.

First, the CPU 6 measures a disk runout amount, for example, at a time of starting the disk drive (For example, the method disclosed in the above-mentioned patent document 2 is used).

Here, where there is no disk runout, a corresponding skew angle θz can be found by the cosine theorem from the following equation (2). That is, $$\theta z = A\ COS((b^2+g^2-v^2)/(2\times b\times g))-90 \quad (2)$$

Where A denotes an angle and b denotes a radial position on the disk medium 1.

Where, on the other hand, any positional displacement p from the track center is present due to a disk runout, a corresponding skew angle θe can be found by the above equation (2) with [b=b+p] given.

From the above equation (1), an offset amount Ofa relative to the skew angle θz given above can be expressed by the following equation (3)

$$OFa = Grw*\sin(\theta z) \quad (3)$$

From this equation (3), an offset amount OFb relative to the skew angle θe given above can be found by the following equation (4)

$$OFb = Grw\times\sin(\theta e) \quad (4)$$

Based on the equations (3) and (4), the CPU 6 calculates the following equation (5) and obtains an offset correction amount OFc corresponding to the disk runout involved.

$$OFc = OFb - OFa \quad (5)$$

The CPU 6 allows the calculated offset correction amount OFc to be stored in the memory 7, for example, in a form corresponding to each segment zone and each servo sector on the disk medium 1.

FIG. 7 shows detailed examples of the offset correction amount OFc calculated at respective sectors corresponding to inner, intermediate and outer peripheral zones 700, 710 and 720. In FIG. 7, the disk runout time is set to be ±20 um. It is found that, even if the disk runout is the same, the offset correction amount varies according to the respective zones at the radial positions of the disk medium 1.

It is to be noted that the CPU 6 calculates the offset correction amount OFc in realtime at a head positioning time without calculating it at a drive starting time and allowing it to be stored in the memory 7.

The CPU 6 obtains an offset correction amount OFc from the memory 7-step S3. That is, when a target position is set, the CPU 6 obtains, from the memory 7, an offset correction amount OFc corresponding to a servo sector following a servo sector for reading out the servo data for detecting the position of the head.

The CPU 6 adds the offset correction amount OFc corresponding to the disk runout to the offset amount OFa of a first position offset amount and calculates a second position offset amount OFd-step S4.

Thus, the CPU 6 adds the second position offset amount OFd to the target position TP and sets a result as a new target position TP and, by doing so, performs a position correction of the read head 32-step S5.

By the above-mentioned positioning operation it is possible to position the read head 32 to the target position at the read operation time. In this case, the target position is not a fixed one and varies depending upon the disk runout amount. With the use of the offset correction amount OFc, the CPU 6 finds the second position offset amount OFd taking the disk runout into consideration. It is, therefore, possible to set the read head 32 to the target position for tracking on the disk medium. It follows that the CPU 6 sets the disk to the target position each time the servo data is detected from the servo sector. That is, in the prior art, in response to the read command, the setting of the target position is made only once while, in the present embodiment, the target position is corrected each time the servo data is detected from the respective servo sector.

Next, a practical example will be explained below in connection with an influence given by the offset amount resulting from the disk runout.

Between the inner diameter of the disk medium 1 and the outer diameter of a hub of the SPM 2 a difference of about 25 um is provided as a design center value, taking into consideration the easiness with which the disk medium 1 is fitted over the hub. Even if a "servo write" operation is made with the disk center set in alignment with the rotation center of the SPM, a disk runout of ±12.5 um occurs, taking into consideration the case where the disk medium 1 is contacted with the hub due to an impact, etc. There may occur a disk runout of ±40 um under the worst condition, taking into consideration the tolerance of the inner diameter of the disk medium 1 and outer diameter of the SPM 2 and center-to-center misalignment.

Here, as one example, consideration will be given to the case where there occurs a disk runout of ±17.5 um.

In a disk medium 1 of, for example, 2.5 inches, the distance between the head 3 and the pivot of the actuator 10 is about 33 mm. Given that a positional displacement of 35 um occurs as a disk runout, a corresponding angle becomes [A TAN (35 um/33 mm)=0.060768228 degree] in the vicinity of a skew angle of 0°. With a gap spacing given as a 7 um, the offset amount becomes [7 um*sin (0.060768228)= 7.42 nm].

Here, it is considered that with the track density on the disk medium 1 given by about 200 KTPI, the track pitch is 127 nm and the reproduction track width of the read head 32 becomes about 70 nm. In this case it follows that, since the offset amount caused by the disk runout is [7.42 nm], it becomes over 10% greater than the reproduction track width. Thus it is estimated that, if the offset amount caused by the disk runout is not corrected, the performance of the read operation by the read head 32 is degraded.

(Write Operation)

FIG. 6 is a flowchart for explaining a head positioning operation at a write operation.

Even at a write operation time, as in the case of the read operation, an offset amount OFd is found while considering an influence caused by the disk runout and the position correction of the write head 35 is performed.

That is, upon receipt of a write command from the host system not shown, the CPU 6 sets the write head 35 to a target position TP of a target track as a write-in target (step S11). In the write operation, the target position TP becomes a target track (cylinder) position calculated from a target logical block address (LBA).

In the same way as set out above, the CPU 6 controls the driving of the actuator 10 and, after performing a seek operation to move the head to the neighborhood of the target position TP, shifts the movement to a "on-track" positioning movement (tracking movement) to a track position as the target position TP. At this positioning movement time, as set out above, the CPU 6 performs a position correction corresponding to the offset.

That is, the CPU 6 calculates the offset amount OFa necessary to the position correction (step S12). And the CPU 6 obtains an offset correction amount OFc from the memory 7 (step S13). Then the CPU 6 adds the offset correction amount OFc corresponding to the disk offset to the offset amount OFa of a first position offset amount and calculates a second position offset amount OFd (step S14).

The CPU 6 performs the position correction of the write head 35 (step S15) by adding the second position offset amount OFd to the target position TP and setting a result as a new target position TP.

In short, according to the disk memory apparatus of the present embodiment, it is possible to achieve a head positioning operation capable of copying with a variation of an offset caused by the disk runout.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
an actuator configured to have a head that includes a write head for writing data on a disk medium and a read head for reading out the data from the disk medium and to position the head relative to a target position on the disk medium;
a calculating unit configured to obtain a first position offset amount between the write head and the read head relative to the target position on the disk medium and to calculate a second position offset amount by using the first position offset amount and an offset correction amount in accordance with a disk runout of the disk medium, the offset correction amount being calculating by correcting the first position offset amount in accordance with the disk runout; and
a control unit configured to perform positioning control including a position correction operation corresponding to the second position offset amount and positioning the read head or write head to the target position on the disk medium.

2. A disk drive according to claim 1, further comprising a memory for storing a parameter for obtaining the first position offset amount and wherein the calculating unit obtains the first position offset amount by use of the parameter read out from the memory.

3. A disk drive according to claim 1, further comprising a unit configured to measure the disk runout amount of the disk medium and calculate the offset correction amount based on the measured disk runout amount and to store the offset correction amount in a memory.

4. A disk drive according to claim 3 wherein the calculating unit calculates the second position offset amount by use of the first position offset amount and the offset correction amount read out from the memory at the positioning control time.

5. A disk drive according to claim 1, wherein the actuator has the head mounted on a slider with the read head and write head mounted in a separate fashion, and, rotationally drives the head to allow the head to be moved in a radial direction on the disk medium under control of the control unit.

6. A method for head positioning control in a disk drive having an actuator and a head that includes a write head for writing data into a disk medium and a read head for reading out the data from the disk medium wherein the driving control of the actuator is effected to position the read head or the write head to a target position on the disk medium, the method comprising:
setting the target position;
calculating a first position offset amount between the write head and the read head in accordance with the target position on the disk medium;
calculating a second offset amount by using the first position offset amount and an offset correction amount in accordance with a disk runout of the disk medium, the offset correction amount being calculating by correcting the first position offset amount in accordance with the disk runout; and
performing a position correction operation for correcting the target position by use of the second offset amount.

7. A method according to claim 6, wherein the disk drive has a memory for storing the offset correction amount which is calculated in accordance with a result of measurement of the disk runout on the disk medium at a starting time and, at a time of the positioning control time, the second offset amount is calculated by obtaining the offset correction amount from the memory and using the first offset amount and offset correction amount.

8. A method according to claim 6, wherein, when, at a read operation of reading out data from the disk medium, positioning control is performed for positioning the read head to the target position on the disk medium, the target position is corrected by use of the second offset amount.

9. A method according to claim 6, wherein, when, at a write operation of writing data on the disk medium, positioning control is performed for positioning the write head to the target position on the disk medium, the target position is corrected by use of the second offset amount.

* * * * *